United States Patent

Guichon

[11] 4,044,967
[45] Aug. 30, 1977

[54] ROUND BALE FEEDER

[76] Inventor: Lawrence Joseph Charles Guichon, G. Guichon Ranch Ltd., Quilchena, British Columbia, Canada, V0E 2RO

[21] Appl. No.: 733,111

[22] Filed: Oct. 18, 1976

[51] Int. Cl.$^2$ .................. B65H 17/46; B65H 75/42
[52] U.S. Cl. .................. 242/86.5 R; 214/DIG. 4; 214/352; 214/506
[58] Field of Search ............ 242/86.5 R, 66, 58.6, 242/86.52; 214/DIG. 3, DIG. 4, 352, 505, 506

[56] References Cited
U.S. PATENT DOCUMENTS

| 3,877,595 | 4/1975 | Edelman | 214/DIG. 3 |
| 3,908,846 | 9/1975 | Brummitt | 242/86.5 R |
| 3,944,095 | 3/1976 | Brown | 214/DIG. 4 |
| 3,968,940 | 7/1976 | Godbersen | 242/86.5 R |

Primary Examiner—Edward J. McCarthy
Attorney, Agent, or Firm—Carver and Company

[57] ABSTRACT

A round bale feeder for transporting and unwinding round bales of hay. The feeder includes wheeled frame carried on ground bearing wheels for towing behind vehicle, and tilting frame hinged to wheeled frame for tilting about hinge axis disposed normally to direction of travel. Front, mid and rear rollers journalled on tilting frame for rotation about axes parallel to hinge axis. Front and rear rollers are spaced apart sufficiently to support a complete round bale thereon, and mid-roller is sufficiently close to one of the remaining rollers to support bale when almost completely unwound. Tilting cylinder cooperates with tilting frame so that actuation of tilting cylinder rotates tilting frame to load bale thereon, and to support bale on rollers. Rollers are powered to rotate bale to unwind swath therefrom as feeder traverses distribution area. Rollers have resilient surfaces which deform under load to produce tooth-like projections to increase forces on bale and to reduce accumulation of unwanted matter thereon.

10 Claims, 8 Drawing Figures

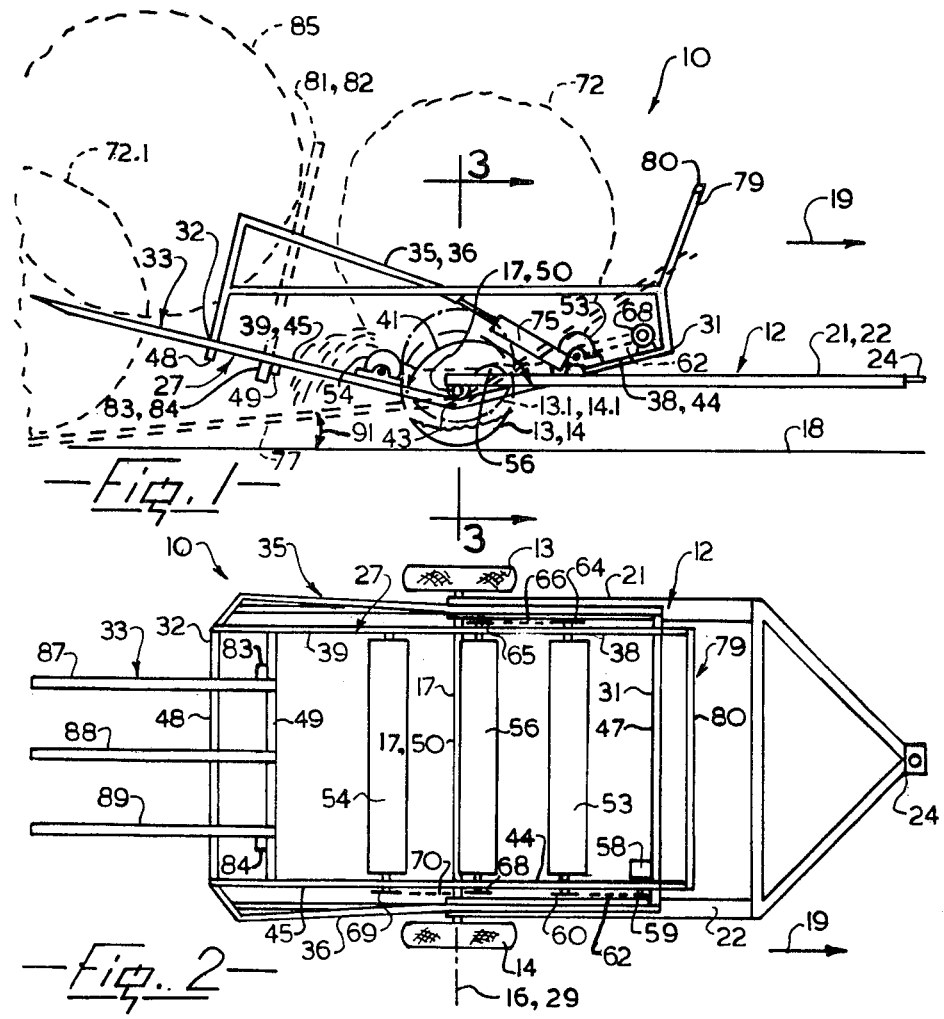
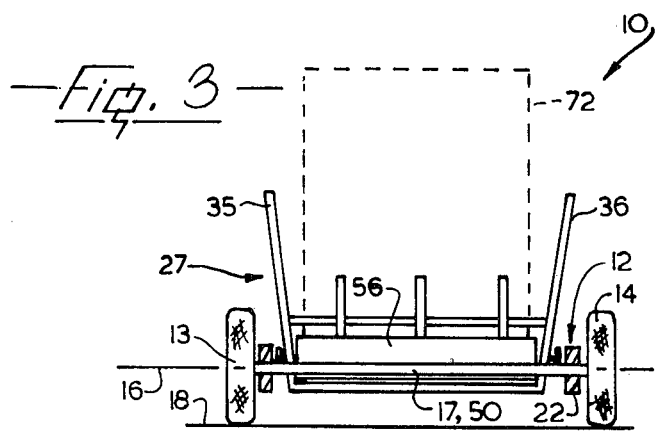

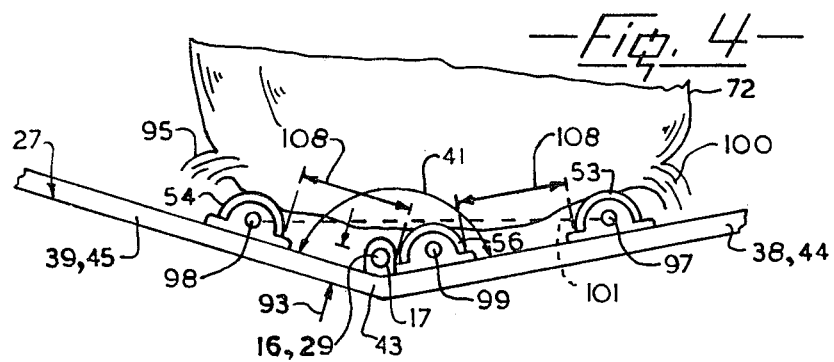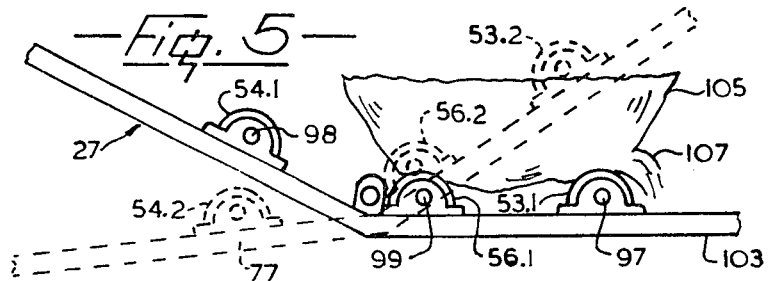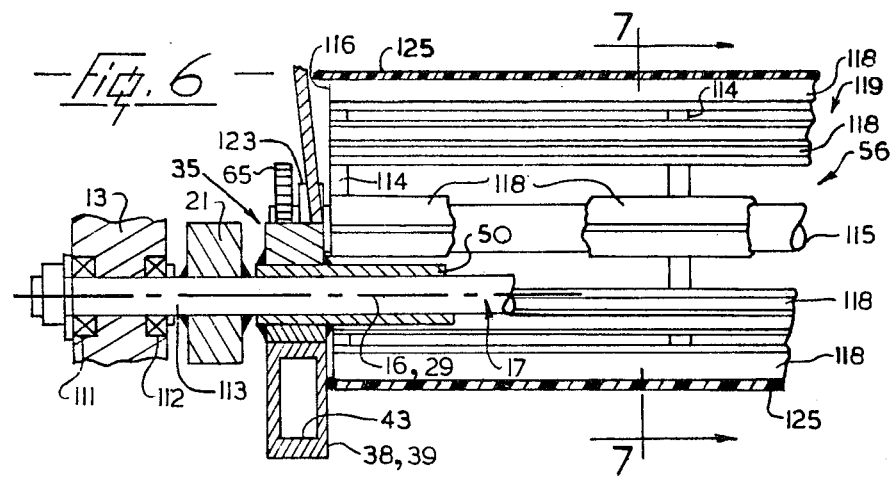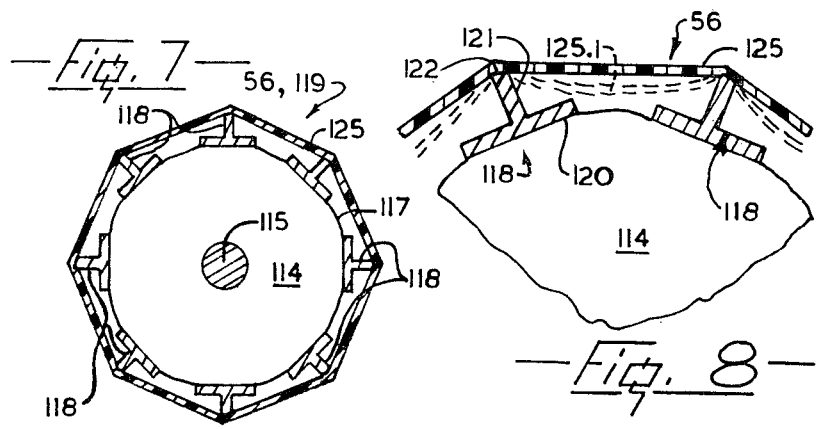

ROUND BALE FEEDER

BACKGROUND OF THE INVENTION

1. Field of the Invention

The invention relates to a round bale feeder for transporting and unwinding round bales of hay or like material.

2. Prior Art

In the last few year, the common rectangular-sectioned hay bale as produced by the conventional harvesting apparatus is being replaced by a cylindrical-sectioned bale of about 6 feet in diameter, 4 to 6 feet long and weighing between 1500 and 3,000 pounds. Such a bale requires mechanized lifting, transporting and distributing or feeding means. Commonly, the bale is rolled or carried by a device to where it is to be fed to cattle, where it is commonly unwound by rolling it down a slope, similarly to unrolling a carpet. This method is unpredictable as the distribution of hay cannot be easily controlled and sometimes a large proportion of the hay is fouled by the cattle before it is eaten and thus is wasted. Also this method of distribution requires a slope, and therefore on level ground other means of distribution are required.

Some mechanical distributing or feeding devices require accurate journalling of the bale on powered end plates whilst the bale is unrolled along the ground. This is unpractical because commonly the bales are not truly cylindrical and tend to disintegrate adjacent the centre. Other distribution devices include a device which cuts the hay in the bale with rotating knives. This latter device requires expensive and powerful equipment, and, if the hay is to be distributed in this manner on a windy day, much of the hay can be blown away before it reaches the ground, resulting in excessive scattering and subsequent wasting of the hay.

SUMMARY OF THE INVENTION

The invention reduces some of the difficulties and disadvantages of the prior art by providing a simple apparatus that can be towed behind a conventional farm tractor, and for its operation utilizes hydraulic power take-off means fitted to most tractors. The device can accomodate bales of a size up to common maximum size and, without other equipment, can load the bales from a storage area to an area where they are to be distributed, and the bale can be unwound in a controlled manner and deposited on the ground in a desired density. The hay can be distributed on a windy day without excessive loss by scattering. Furthermore the device is relatively simple to make, easy to maintain and does not require specialized skills for its operation.

A round bale feeder according to the invention includes a wheeled frame which is carried on ground bearing wheels and is adapted to be towed behind a vehicle. The feeder includes a tilting frame hinged for rotation relative to the wheeled frame about a hinge axis disposed generally normally to direction of travel of the wheeled frame, the tilting frame having front and rear ends and a loading ramp at the rear end thereof. The feeder includes front and rear rollers and a mid-roller positioned between the front and rear rollers, the rollers being journalled on the tilting frame for rotation about roller axes disposed parallel to the hinge axis so as to extend transversely across the tilting frame. At least one of the rollers is powered and the front and rear rollers are spaced apart longitudinally sufficiently to support a complete round bale thereon. The mid-roller is sufficiently close to one of the remaining rollers to support the bale when almost completely unwound. Tilting means cooperate with the tilting frame so that actuation of the tilting means rotates the tilting frame to lower the loading ramp towards to the ground to permit the bale to be loaded onto the tilting frame, and to position the rollers relative to each other to permit positioning of the bale on at least two rollers.

A detailed disclosure following, related to drawings, describes a preferred embodiment of the invention, which is capable of expression in structure other than the particularly described and illustrated.

DESCRIPTION OF THE DRAWINGS

FIG. 1 is a simplified side elevation of a round bale feeder according to the invention shown transporting two round bales thereon, another bale being shown positioned relative to the feeder prior to loading, FIG. 2 is a simplified top plan view the feeder of FIG. 1, no bales being shown, some portions being omitted, FIG. 3 is a simplified transverse section of the device generally on line 3—3 of FIG. 1, some portions being omitted, FIG. 4 is a detailed view of rollers mounted adjacent a hinge portion of the apparatus, showing a large bale supported on three rollers, some portions being omitted, FIG. 5 is a detailed view similar to FIG. 4 showing two further positions of the rollers, a smaller bale being supported, FIG. 6 is a simplified detailed section adjacent one side of the feeder, taken generally on line 3—3 of FIG. 1, FIG. 7 is a simplified transverse section through a roller, as taken generally on line 7—7 of FIG. 6, FIG. 8 is a detailed section adjacent a periphery of the roller of FIG. 7.

DETAILED DISCLOSURE

FIGS. 1 through 3

A round bale feeder 10 according to the invention includes a wheeled frame 12 carried on ground bearing wheels 13 and 14 journalled for rotation about a wheel axis 16 extending transversely across the feeder. The wheels are carried on a transversely extending axle 17 and support the feeder on ground 18, the feeder being adapted to be towed behind a vehicle in a direction of travel designated by an arrow 19. The wheeled frame includes a pair of generally similar, laterally spaced, longitudinally extending left hand and right hand chassis members 21 and 22, the chassis members having rear ends cooperating with the axle 17. The chassis members have forward ends cooperating with a towing hitch 24 which can be coupled to a common farm tractor or other self-propelled vehicle.

The feeder also includes a tilting frame 27 journalled for rotation relative to the wheeled frame 21 about a hinge axis 29 disposed generally normally to the direction of travel. The frame 27 has front and rear ends 31 and 32 and a loading ramp 33 at the rear end thereof. The tilting frame includes two generally similar, laterally spaced, longitudinally extending side members 35 and 26, the side members being characterized by a frame work of undesignated structural members and sheet steel members to stiffen the frame, the sheet steel members not being shown in the drawings. The side member 35 includes front and rear beams 38 and 39 extending from an apex 43 and inclined at a shallow angle 41 to each other, the apex being generally adjacent and below the wheel axis. The side member 36 has similar inclined front and rear beams 44 and 45 disposed within planes containing the beams 38 and 39. Front and rear connecting members 47, 48 and 49 extend between the pairs of beams 38 and 44, and 39 and 45 as shown to provide a closed-sided frame with open ends and a shallow V-sectioned open base. A transverse tube 50 extends between the beams adjacent the apex 43 that is, adjacent the hinge axis. As will be described in greater detail with reference to FIG. 6, the tube 50 encloses the axle 17 to serve as the hinge means to journal the tilting frame on the wheeled frame. The hinge axis 29 of the tilting frame is thus concentric with the wheel axis 16, but this is a convenience and is not an essential.

Front and rear rollers 53 and 54 are journalled in bearings carried on the beams so as to extend between the beams, the front and rear rollers being journalled forwardly and rearwardly respectively of the hinge axis. A mid-roller 56 is positioned between the front and rear rollers and is similarly supported on bearings carried on the beams, the three rollers thus being journalled on the tilting frame for rotation about respective roller axes disposed parallel to the hinge axis so as to extend transversely across the tilting frame, the axes being designated in FIGS. 4 and 5 only. A hydraulic motor 58 is mounted adjacent the forward end of the hinged frame and powers the roller 53 through a chain 62 running on a drive sprocket 59 driven by the motor and a sprocket 60 on the roller 53. A chain 66 runs on sprockets 64 and 65 adjacent left hand ends of the rollers 53 and 56 respectively so that the drive from the roller 53 is transmitted to the roller 56. Similarly, a chain 70 running on sprockets 68 and 69 adjacent right hand ends of the rollers 56 and 54 transmits power from the roller 56 to the roller 54. The motor 58 is a variable speed, reversible hydraulic motor which can be driven from a hydraulic power take-off provided on the conventional farm tractor, and thus the rollers are powered for rotation in either direction. The sprockets associated with the front roller 53 are selected so that the front roller rotates at a higher speed than the mid-roller and the rear roller. For example, for rollers of about 10 inches maximum measurement of diameter, the roller 53 would rotate at about 80 rpm when the rollers 54 and 56 rotate at about 70 rpm, that is about 10 rpm difference in speed for a full sized bale. This results in a difference in peripheral speeds of the rollers which has particular application for initiating unwinding of the bales as will be described. Alternatively, the rear or mid-roller could be geared for a higher rotational speed than the remaining rollers. In any event, for rollers of equal size as shown, one roller is geared to rotate at a higher speed than the remaining rollers. Alternatively different sized rollers rotating at the same speed could be used to attain the desired peripheral speed difference. As best seen in FIGS. 2 and 3, the side members are inclined upwardly and outwardly and the sprockets and chains are located outside the side members to reduce contamination as will be described. In some application, one powered roller and two free wheeling rollers may be adequate but preferably all three rollers are powered.

The rollers are spaced apart longitudinally sufficiently to support a complete round bale thereon, a bale at its maximum diameter being shown in broken outline at 72. The outwardly and upwardly inclined side members 35 and 36 facilitate positioning of the bale on the rollers during loading thereof as will be described. Prior to loading the bale 72 is on the ground in a position shown in broken outline at 72.1.

As best seen in FIG. 2, the chassis members are spaced apart sufficiently to permit the tilting frame to swing therebetween. A tilting cylinder 75, FIG. 1 only, extends between the tilting frame and the wheeled frame so that extension and retraction of the cylinder rotates the tilting frame relative to the wheeled frame. Referring again to FIG. 1, the tilting frame can swing from a rearwardly lowered position, shown in broken outline at 77, through a normal carrying position shown in full outline, to a forwardly lowered position, not shown in FIG. 1. If desired, the cylinder 75 can be extended further than that necessary for the loading ramp to contact the ground, thus causing the wheels to rise upwards clear off the ground to broken outline positions 13.1, 14.1. The rearwardly lowered position and the positions with wheels raised clear off the ground are used for loading bales onto the tilting frame, and the forwardly lowered position is used to carry an almost completely unwound bale on the mid and forward rollers as will be described with reference to FIG. 5. The tilting cylinder thus serves as a tilting means which cooperates with the tilting frame so that actuation of the tilting means rotates the tilting frame to lower the loading ramp towards the ground to permit a bale to be loaded onto the tilting ramp, and to position the rollers relative to each other to permit positioning of the bale on to at least two rollers, as will be described. For symmetry, a tilting cylinder fitted to each side of the frame is preferred, and it should be noted that the cylinders are omitted from FIGS. 2 and 3.

As best seen in FIG. 1, the forward end 31 of the tilting frame carries a forward stop 79 which is an upper transverse member 80 extending between a pair of uprights. The stop 79 prevents the bale 72 from rolling forwardly and off the forward end of the tilting frame. A pair of generally parallel, vertical removable rear stop members 81 and 82, shown only in broken outline in FIG. 1, are releasably fitted in sockets 83 and 84 adjacent the rear end 32. The stop members 81 and 82 are used usually only when transporting a second bale 85 (broken outline) which is carried mainly on the loading ram 33 and leans against the stop members 81 and 82, whilst the first bale 72 is simultaneously carried on the three rollers 53, 54 and 56.

FIG. 1 through 5

As best seen in FIG. 2, the loading ramp 33 has three generally parallel, rearwardly extending struts 87 through 89 which are secured to the rear connecting members 48 and 49 and are generally aligned laterally with the rear beams 39 and 45. It is seen that the rear beams 39 and 45 are positioned below the hinge axis 29, and thus as seen in FIGS. 1 and 4, the loading ramp is disposed so that a forward projection of a central axis of the ramp passes beneath the hinge axis. Thus when the tilting frame is tilted downwardly at the rear to the rearwardly lowered position 77, the loading ramp swings downwards and contacts the ground at a relatively shallow angle 91 to facilitate loading of a bale thereon. As shown in FIG. 4 only, a perpendicular spacing 93 between the forward projection of the loading ramp axis and the hinge axis determines in part the angle 91 and, other factors being constant, an increase in the spacing 93 causes the angle 91 to become more shallow thus facilitiating loading of the bale onto the tilting frame.

FIGS. 4 and 5

In FIG. 4, a portion of the maximum diameter round bale 72 is shown in full outline positioned on the forward, mid and rear rollers 53, 56 and 54 respectively with a swath 95 unwinding from the bale rearwardly of the rear roller 54 and passing between the side members of the tilting frame, not shown. The rollers 53, 54 and 56 have respective axes of rotation designated 97, 98, and 99 respectively. To support the maximum diameter bale 72 on the three rollers, it is seen that the axis 99 of the mid-roller is positioned below a straight line 101, shown broken, extending between the axes 97 and 98 of the front and rear rollers respectively. The swath 95 can unwind rearwardly from the bale over the rear roller 54, or if required an alternate swath 100 can unwind from the bale over the forward roller 53. The particular direction of unwinding is dependent on orientation of the bale, and the latter position of the swath 100 is sometimes preferred as the operator can see clearly how the swath is unwinding forwardly, whereas it is difficult to monitor a swath unwinding rearwardly from the bale.

As unwinding progresses, the bale becomes smaller and the tilting cylinder is actuated if necessary to maintain the bale on the three rollers. Eventually the bale becomes an inner core 105 shown in full outline in FIG. 5, which is too small to be supported on the three rollers and thus assumes a position supported on two of the rollers, ie the mid-roller and one other roller. Thus the mid-roller 56 is sufficiently close to one of the remaining rollers to support the bale when almost completely unwound. In FIG. 5 the frame has been tilted forwardly to a forward position 103, shown in full outline, in which the inner core 105 is shown positioned on forward positions 53.1 and 56.1 of the forward and mid-rollers 53 and 56 respectively, with the swath 100 unwinding forwardly of the forward roller. The mid-roller 56 is journalled on the tilting frame so as to be disposed forwardly of the hinge axis 29 and spaced from the forward roller 53 an amount sufficient to support the inner core 105 of the round bale on the rollers 53 and 56 immediately prior to essentially complete unwinding of the bale. This forward position of the mid-roller is convenient for unwinding the bale forwardly when supported in the forward and mid-rollers but, if desired, the mid-roller could be positioned rearwardly of the hinge axis for supporting the core on the rear and mid-rollers.

The rollers have diameters of approximately 10 inches and the axes of the rollers are spaced apart approximately 24 inches. Thus there are gaps 108 of about 14 inches between opposed faces of adjacent rollers which permit the bale to be unwound until the inner core 105 attains a diameter of about 14 inches before it falls through the space between the forward and mid-rollers. Thus, as the bale is unwound to its inner end, for a correctly unwound bale, the largest unrolled mass of hay is that of a minimum sized inner core supported on the rollers, which is typically about 14 inches in diameter. Clearly, if the rollers were spaced closer, or were larger in diameter a minimum core of smaller diameter could be attained. Centres of the front and rear rollers 53 and 54 are spaced about 4 feet apart and, when the front and rear rollers are disposed at approximately the same level, a maximum size bale of about 6 feet in diameter can be carried thereon. If the feeder passes over relatively uneven or steep ground, the bale is prevented from rolling off forwards or backwards by the forward and rear stops as previously described. In FIG. 5, the frame 27 is also shown in broken outline at 77 in the rearwardly lowered position used for loading bales onto the feeder, the rollers being shown in positions 53.2, 54.2 and 56.2.

FIGS. 6 through 8

Referring to FIG. 6, the wheel 13 is journalled for rotation about the axle 17 on a pair of conventional spaced bearings 111 and 112, the axle being secured against rotation relative to the chassis member 21 adjacent a left hand end 113 thereof, and to the chassis member 22 adjacent the right hand end thereof, not shown. The tube 50 is secured to the side member 35, and as previously described, encloses the axle 17 and serves as a journalling means to permit relative rotation between the tilting frame and the wheeled frame.

With reference also to FIGS. 7 and 8, the mid-roller 56 includes a plurality of spaced formers 114 spaced between ends of the rollers, a left hand end 116 of the roller only being shown. A roller axle 115 is secured to and extends through centres of the formers and is journalled in bearings at opposite ends of the roller carried on the beans, a left hand bearing 123 only being shown. The sprocket 65 is secured to the end of the roller axle 115 and engages the chain 66, not shown, and it can be seen that the outwardly inclined side member 35 not only facilitates location of the bale on the rollers but also overhangs and protects to some extend the sprockets and chains positioned outwardly of the side members. The formers have generally similar peripheries 117, and a plurality of stringers, severally 118, are secured to the peripheries of the formers so as to define an open framework 119 having an outer form generally approaching that of a cylinder, maximum tranverse measurement being termed "diameter" for convenience.

As seen best in FIG. 8, a typical stringer 118 is T-sectioned as shown and has a flange portion 120 secured to the periphery 117 of the former 114, and a web portion 121 extending outwardly therefrom to an outer edge 122. The flange portion 120 of the stringer provides a broad base for welding the stringer to the former and the web portion 121 provides strength with lightness, and thus a light weight roller framework is provided.

A flexible membrane 125 encloses the outer form defined by the stringers and extends between adjacent outer edges of the stringers and between opposite ends of the rollers so as to provide a resilient roller surface. The membrane is a suitable elastomer, such as a synthetic rubber, and has a thickness of the order of 0.050 ins. The membrane 125 provides a flexible roller skin which, when loaded by a bale, can deform as shown in broken outline 125.1 in FIG. 8. When the bale rests on the roller and the roller rotates, the membrane is deflected continuously which reduces accumulation of unwanted matter on the roller surface, for example ice, mud, or other undesirable material that might otherwise collect if the roller surface were rigid. When the membrane 125 is deflected under load of the bale to the broken outline position 125.1, the edges 122 of the stringers distend the membrane locally to provide a tooth-like projection. This increases frictional and tangential forces between the rollers which may be required for separating the swath from the bale as which will be described. It has been found that common automobile inner tubes provide a flexible membrane of adequate strength and acceptable frictional characteristics and provide adequate driving means for rotatin and supporting the bale. Ends of the membrane extend closely adjacent to the side members 35 and 36, see FIG. 3, so as to reduce intrusion of foreign matter into the bearings of the roller axle and to reduce a tendency of hay, string etc. to wrap around the roller axle 115.

Other types of rollers, for example, rollers with projecting, tines, teeth etc. or other means to drive the bale may be suitable in some circumstances, but it has been found that the flexible membrane enclosing the generally cylindrical famework requires less cleaning than the many conventional rollers that are commonly used in hay handling apparatus. It is well known that rollers with tines collect hay, string etc. from the bale, and usually require frequent cleaning and also can be dangerous to operators.

OPERATION

The towing hitch 24 of the wheeled frame is coupled to a hitch of a conventional farm tractor, not shown and fluid ports of the hydraulic motor 58 and tilting cylinder 75 are connected to the conventional hydraulic power take-off ports provided on many tractors which are controlled by suitable valves to control actuation of the motor and the cylinder. The tractor is driven rearwardly to direct the feeder 10 towards the bale at 72.1, the loading ramp 33 being lowered prior to passing under the bale as shown in FIG. 1. If desired, the cylinder 75 can by actuated further than that necessary to merely lower the ramp 33, so as to raise the wheels 13 and 14 to the raised position 13.1 and 14.1 to ensure that the struts 87 and 89 of the ramp carry a portion of the feeder weight and thus pass easily under the bale. The tractor reverses as far as practical to ensure that the bale is moved sufficiently along the loading ramp so that when the cylinder 75 is retracted the tilting frame can swing upwards carrying the bale thereon. When the frame attains sufficient forward and downward inclination, the bale rolls forwards along the frame and onto the three rollers 53, 54 and 56. The cylinder 75 is actuated so that the bale sits generally evenly on the rollers for transportation. If the second bale 85 is to be carried, the rear stop members 81 and 82 are fitted in the complementary sockets 83 and 84, and the cylinder 75 is again actuated so as to lower the ramp 33 which can be passed under the second bale 85, the stops 82 and 81 now preventing the first bale 72 from rolling backward. When the second bale is sufficiently supported by the loading ramp, the cylinder 75 is again actuated to tilt the tilting frame forward, causing the second bale to roll forward and rest against the rear stop members 81 and 82. The tractor can now drive to the site where the bales are to be distributed, both bales being carried on the feeder.

To prevent the cattle prematurely eating the second bale before it is unwound, the second bale is preferably carried on the feeder whilst the bale 72 is being unwound. The tractor drives forwardly into the area where the first bale is to be distributed, the second bale being restrained against forward movement by the rear stop members 81 and 82. Commonly, the free outer end of the swath is tied to the bale with peripheral strings, which are cut prior to unwinding. The hydraulic motor 58 is started so as to rotate the rollers in a direction to unwind the bale. The swath may start to unwind automatically and pass rearwardly over the rear roller 54, or forwardly over the forward roller 53, depending on the orientation of the bale and the direction of rotation of the bale. If the weight of the free end of the swath does not unwind itself automatically from the bale, the rollers are kicked from forward to reverse directions quickly, which exerts considerable tangential forces on the bale which tends to shear the free end of the swath from the bale to initiate unwinding thereof. The speed of rotation of the rollers is adjusted with the speed of the tractor to provide a depth of distribution of the swath as required. If the swath is heavily matted to the core of the bale it will tend to break frequently and stop unwinding. To recommence unwinding, direction of roller rotation is rapidly changed so that inertia of the bale tends to shear the swath from the core due to high tangential forces from the rollers acting on the outer layers of the bale.

As previously stated, the forward roller 53 is driven at a higher rpm than the remaining two rollers and thus there is a peripheral speed difference between the forward roller and the remaining two rollers. This speed difference produces excessive shear forces on the outer swath wrapped around the bale also tending to initiate unrolling of the swath from the core. The flexible membrane of the rollers deflects, under vertical and shear forces, thus exagerating the tooth-like projections of the stringer 118 which reduces a tendency of the bale to slip on the rotating rollers, particularly where there is a change in direction of the roller rotation. It has been found that the peripheral speed difference between the forward roller and the remaining two rollers, the exageration of the tooth-like projections of the stringers due to membrane deflection, and the relativey high frictional forces between the flexible membrane and the bale will cause most swaths to unwind without manual intervention. It has been found that even a bale that has been formed for over one year can be relatively easily unwound with little attention from the operator apart from visual monitoring to ensure that the swath continues to unwind.

As the diameter of the bale becomes progressively smaller, speed of rotation of the rollers is increased to maintain approximately constant depth of deposited hay. When the bale becomes too small to be carried on the three rollers, the tilting frame is tilted downwardly and forwardly so that the small diameter bale rolls preferably onto the forward and mid-rollers 53 and 56 respectively, which attain the forward lowered positions 53.1 and 56.1 as shown in FIG. 5. Again if the swatch is excessively matted to the core usually unwinding of the swath from the core can be initiated by the peripheral speed difference between the forward roller and the middle roller. If the rear roller is geared to produce a higher peripheral speed than the remaining two rollers, when the core becomes too small to be carried on three rollers, the frame 27 is tilted backwards so that the core is rolled onto the rear and mid-rollers 54 and 56. The core is unwound until its diameter becomes too small to be supported by the two rollers, when its drops between the two rollers and this effectively completes the unwinding of the bale.

The second bale 85 can now be unwound by removing the rear stop members 81 and 82 to permit the bale 85 to roll onto the rollers for unwinding.

I claim:

1. A round bale feeder for transporting and unwinding round bales of hay or like material, the feeder including:

a. a wheeled frame carried on ground bearing wheels and adapted to be towed behind a vehicle,
b. a tilting frame hinged for rotation relative to the wheeled frame about a hinge axis disposed generally normally to direction of travel of the wheeled frame, the tilting frame having front and rear ends and a loading ramp at the rear end thereof,
c. front and rear rollers and a mid-roller positioned between the front and rear rollers, the rollers being journalled on the tilting frame for rotation about roller axes disposed parallel to the hinge axis so as to extend transversely across the tilting frame, at least one of the rollers being powered, the front and rear rollers being spaced apart longitudinally sufficiently to support a complete round bale thereon, the mid-roller being sufficiently close to one of the remaining rollers to support the bale when almost completely unwound,
d. tilting means cooperating with the tilting frame so that actuation of the tilting means rotates the tilting frame to lower the loading ramp towards the ground to permit the bale to be loaded onto the tilting frame and to position the rollers relative to each other to permit positioning of the bale on at least two rollers.

2. A feeder as claimed in claim 1 in which:
a. the front and rear rollers are journalled forwardly and rearwardly respectively of the hinge axis.

3. A feeder as claimed in claim 1 in which:
a. the tilting means cooperates with the tilting frame and the wheeled frame.

4. A feeder as claimed in claim 2 in which:
a. the roller axis of the mid-roller is positioned below a straight line extending between the roller axes of the front and rear rollers.

5. A feeder as claimed in claim 4 in which:
a. the mid-roller is journalled on the tilting frame so as to be disposed forwardly of the hinge axis and to be spaced from the forward roller an amount sufficient to support an inner core of the round bale immediately prior to essentially complete unwinding of the bale.

6. A feeder as claimed in claim 4 in which:
a. the rollers are of generally equal size and are powered for rotation in either direction,
b. one roller is geared to rotate at a higher speed than the remaining rollers.

7. A feeder as claimed in claim 1 in which:
a. the wheeled frame is supported on a pair of ground bearing wheels journalled for rotation about a wheel axis extending transversely across the feeder,
b. the hinge axis of the tilting frame is concentric with the wheel axis.

8. A feeder as claimed in claim 7 in which:
a. the wheels are carried on a transversely extending axle,
b. the wheeled frame has a pair of generally similar, laterally spaced, longitudinally extending chassis members having rear ends cooperating with the axle of the wheels, and forward ends cooperating with a towing hitch, the chassis members being spaced apart to permit the tilting frame to swing therebetween,
c. the tilting frame includes two generally similar, laterally spaced, longitudinally extending side members, each side member having generally straight front and rear beams inclined at a shallow angle to each other at an apex generally adjacent the wheel axis, at least two transverse connecting members extending between the beams at adjacent ends thereof to provide a frame with open ends and a shallow V-sectioned open base, and a transverse tube extending between the beams at the hinge axis and enclosing the axle to serve as a hinge means to journal the tilting frame on the wheeled frame,
d. the rollers are journalled for rotation in bearings carried on the beams so as to extend transversely between the beams.

9. A feeder as claimed in claim 1 in which:
a. the loading ramp extends from the rear end of the tilting frame and is disposed so that a forward projection of a major axis thereof passes beneath the hinge axis,
so that when the tilting frame is tilted downwardly at the rear, the loading ramp swings downwards and contacts the ground at a relatively shallow angle to facilitate loading of the bale thereon.

10. A feeder as claimed in claim 1 in which each roller is charcterized by:
a. a plurality of spaced formers having generally similar peripheries and spaced between ends of the rollers,
b. a plurality of stringers cooperating with and spaced around the peripheries of the formers so as to define an open framework having an outer form generally approaching that of a cylinder,
c. a flexible membrane enclosing the outer form defined by the stringers and extending between ends of the rollers so as to provide a resilient roller surface which reduces adhesion of unwanted matter thereon.

* * * * *